US009511678B2

(12) United States Patent  
Tateno et al.

(10) Patent No.: US 9,511,678 B2  
(45) Date of Patent: Dec. 6, 2016

(54) FACILITY INFORMATION PRESENTATION DEVICE AND FACILITY INFORMATION PRESENTATION METHOD

(75) Inventors: Minoru Tateno, Saitama (JP); Kenji Nagafuji, Saitama (JP)

(73) Assignee: PIONEER CORPORATION, Kanagawa (JP)

( * ) Notice: Subject to any disclaimer, the term of this patent is extended or adjusted under 35 U.S.C. 154(b) by 211 days.

(21) Appl. No.: 14/365,110

(22) PCT Filed: Dec. 16, 2011

(86) PCT No.: PCT/JP2011/079184  
§ 371 (c)(1),  
(2), (4) Date: Jun. 13, 2014

(87) PCT Pub. No.: WO2013/088569  
PCT Pub. Date: Jun. 20, 2013

(65) Prior Publication Data  
US 2014/0340048 A1 Nov. 20, 2014

(51) Int. Cl.  
*B60L 11/00* (2006.01)  
*B60L 11/18* (2006.01)  
*G01C 21/36* (2006.01)

(52) U.S. Cl.  
CPC ........ *B60L 11/1848* (2013.01); *B60L 11/1816* (2013.01); *B60L 11/1861* (2013.01); *G01C 21/3679* (2013.01); *B60L 2230/40* (2013.01); *B60L 2240/62* (2013.01); *B60L 2240/622* (2013.01); *B60L 2240/72* (2013.01); *B60L 2240/80* (2013.01); *B60L 2250/16* (2013.01); *B60L 2260/52* (2013.01);  
(Continued)

(58) Field of Classification Search  
None  
See application file for complete search history.

(56) References Cited

U.S. PATENT DOCUMENTS 6,009,403 A * 12/1999 Sato ...................... G01C 21/343  
340/990  
7,103,368 B2 * 9/2006 Teshima .................. G06Q 30/02  
455/412.2  
(Continued)

FOREIGN PATENT DOCUMENTS

JP 2003-262525 9/2003  
JP 2006-112932 4/2006  
(Continued)

OTHER PUBLICATIONS

International Search Report PCT/JP2011/079184 dated Mar. 13, 2012.

*Primary Examiner* — Leigh Garbowski  
(74) *Attorney, Agent, or Firm* — Young & Thompson

(57) ABSTRACT

A calculating part acquires a current position from an acquiring part. The calculating part searches for the position of a charging facility in charging facility information within a retaining part on the basis of the acquired current position, and specifies the charging facility for a next charging. The calculating part calculates a charging time based on a charged amount and a charging capacity of the specified charging facility. A selecting part selects peripheral facilities presented to a user based on calculated charging time and a standard time indicating an average time spent on using each peripheral facility registered in association with the specified charging facility retained in the retaining part, and displays the information regarding the selected peripheral facilities on the display part. Thus, assistance can be provided for the effective use of the time needed to charge a storage cell onboard a moving body at a charging facility.

11 Claims, 7 Drawing Sheets

| Identifier | Position of Charging Facility | Charging Capacity | Stay Possibility Once Charged | Information on Peripheral Facilities ||||
|---|---|---|---|---|---|---|---|
| | | | | Kind of Peripheral Facility | Name of Peripheral Facility | Standard Time | Position of Peripheral Facility |
| IDT$_1$ | POS$_1$ | PWA$_1$ | Possible | PK$_{11}$ | NM$_{11}$ | TS$_{11}$ | PS$_{11}$ |
| | | | | PK$_{12}$ | NM$_{12}$ | TS$_{12}$ | PS$_{12}$ |
| | | | | ⋮ | ⋮ | ⋮ | ⋮ |
| IDT$_2$ | POS$_2$ | PWA$_2$ | Impossible | PK$_{21}$ | NM$_{21}$ | TS$_{21}$ | PS$_{21}$ |
| | | | | PK$_{22}$ | NM$_{22}$ | TS$_{22}$ | PS$_{22}$ |
| | | | | ⋮ | ⋮ | ⋮ | ⋮ |
| ⋮ | ⋮ | ⋮ | | ⋮ | ⋮ | ⋮ | ⋮ |

122

(52) U.S. Cl.
CPC ....... *B60L 2260/54* (2013.01); *B60L 2260/58* (2013.01); *Y02T 10/7005* (2013.01); *Y02T 10/705* (2013.01); *Y02T 10/7044* (2013.01); *Y02T 10/7088* (2013.01); *Y02T 10/7291* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01); *Y02T 90/168* (2013.01); *Y04S 30/12* (2013.01)

(56) References Cited

U.S. PATENT DOCUMENTS

| | | | |
|---|---|---|---|
| 7,363,319 B2 * | 4/2008 | Cappellini | G06Q 10/02 |
| 8,041,348 B1 * | 10/2011 | Fujisaki | H04M 1/72522 370/486 |
| 8,301,365 B2 * | 10/2012 | Niwa | B60L 3/12 701/439 |
| 8,364,388 B2 * | 1/2013 | Naito | B60L 11/1809 701/439 |
| 8,452,642 B2 * | 5/2013 | Matsuyama | G06Q 50/06 705/13 |
| 8,457,821 B2 * | 6/2013 | Shaffer | B60L 11/184 180/272 |
| 8,710,797 B2 * | 4/2014 | Niwa | B60L 11/1838 320/104 |
| 8,755,968 B2 * | 6/2014 | Gottlieb | G01C 21/3682 701/36 |
| 9,091,559 B2 * | 7/2015 | Hancock | B60L 3/12 |
| 9,243,913 B1 * | 1/2016 | Lehman | G01C 21/20 |
| 2005/0044077 A1 | 2/2005 | Shibata | |
| 2006/0248479 A1 * | 11/2006 | Hilbich | H04L 69/329 715/864 |
| 2008/0243330 A1 * | 10/2008 | Kato | B60L 11/123 701/29.5 |
| 2010/0106631 A1 * | 4/2010 | Kurayama | B60L 11/1816 705/34 |
| 2010/0174705 A1 * | 7/2010 | Iwahori | G01C 21/26 707/723 |
| 2010/0256846 A1 * | 10/2010 | Shaffer | B60L 11/184 701/22 |
| 2011/0191266 A1 * | 8/2011 | Matsuyama | G06Q 50/06 705/412 |
| 2013/0339072 A1 * | 12/2013 | Touge | G06Q 10/00 705/5 |

FOREIGN PATENT DOCUMENTS

| | | |
|---|---|---|
| JP | 2009-204363 | 9/2009 |
| JP | 2010-078484 | 4/2010 |
| JP | 2011-174711 | 9/2011 |
| WO | 03079230 | 9/2003 |

* cited by examiner

| Identifier | Position of Charging Facility | Charging Capacity | Stay Possibility Once Charged | Information on Peripheral Facilities ||||  |
|---|---|---|---|---|---|---|---|
| | | | | Kind of Peripheral Facility | Name of Peripheral Facility | Standard Time | Position of Peripheral Facility |
| $IDT_1$ | $POS_1$ | $PWA_1$ | Possible | $PK_{11}$ | $NM_{11}$ | $TS_{11}$ | $PS_{11}$ |
| | | | | $PK_{12}$ | $NM_{12}$ | $TS_{12}$ | $PS_{12}$ |
| | | | | ------- | ------- | ------- | ------- |
| $IDT_2$ | $POS_2$ | $PWA_2$ | Impossible | $PK_{21}$ | $NM_{21}$ | $TS_{21}$ | $PS_{21}$ |
| | | | | $PK_{22}$ | $NM_{22}$ | $TS_{22}$ | $PS_{22}$ |
| | | | | ------- | ------- | ------- | ------- |
| ------- | ------- | ------- | ------- | ------- | ------- | ------- | ------- |

FACILITY INFORMATION PRESENTATION DEVICE AND FACILITY INFORMATION PRESENTATION METHOD

TECHNICAL FIELD

The present invention relates to a facility information presentation device, to a facility information presentation method, to a facility information presentation program, and to a recording medium upon which the facility information presentation program is recorded.

BACKGROUND ART

In recent years, electric automobiles using electric energy saved in storage cells as driving energy have become widespread. When such electric automobiles are used to move, it sometimes needs to charge a storage cell onboard at a charging facility.

Currently, although it depends on the charging amount, charging of the storage cell onboard generally takes longer time than refueling a conventional car with gasoline. Therefore, technologies for effectively using the time for charging the storage cell onboard have been proposed.

As one example of such technologies, there is the technology that presents information on the charging facilities located within a movable range to which the vehicle moves with the remaining amount in a storage cell onboard with information of the names of peripheral facilities of the charging facility (refer to Patent Document #1 (hereinafter, it is referred to as "the prior art example #1")). In the technology disclosed in the prior art example #1, the charging time at each charging facility is calculated based on the remaining amount in the storage cell onboard. Subsequently, the names of peripheral facilities and the charging times are linked and displayed at each charging facility located within a reachable range. Moreover, the charging facility specified by a user with reference to the displayed information is set as the charging facility at which to be visited.

In addition, as another example of the conventional technologies, there is the technology that presents the position information for the charging facilities along the travel route bounds for the destination by the vehicle, and tourist facility information around the charging facility (refer to Patent Document #2 (hereinafter, it is referred to as "the prior art example #2")). In the technique disclosed in the prior art example #2, the position information of the charging facility, and the names and positions of tourist facilities surround the charging facility are also displayed with guidance regarding the travel route bound for the destination by the vehicle.

PRIOR ART DOCUMENTS

Patent Documents

Patent Document #1: Japanese Laid-open Patent Publication 2011-174711
Patent Document #2: Japanese Laid-open Patent Publication 2006-112932

SUMMARY OF THE INVENTION

Problems to be Solved by the Invention

In the prior art example #1, information on the charging facility, the charging time, and the names of surrounding facilities of the charging facility are presented. In addition, in the prior art example #2, information on the charging facility, the charging time, and the names and positions of surrounding facilities of the charging facility are presented. Therefore, in order to effectively use the charging time at the charging facility, the user needs to estimate expended hours for utilizing peripheral facilities of the charging facility. However, if the user has once visited the peripheral facilities, he may precisely estimate the expended hours for utilizing the peripheral facilities. However, if not, he cannot estimate the expended hours for utilizing the peripheral facilities accurately.

Consequently, huge difference may generate between the time needed for charging and the expended hours for actually utilizing the facility. Therefore, the technology to reduce the deviation time between the expended hours for utilizing the facility and the charging time has been awaited, when the user utilizes the peripheral facility during the completion of charging, even the user has not visited them. Responding to this requirement is considered as being one problem to be solved by the present invention.

The present invention has been conceived in consideration of the circumstances described above, and its object is to provide a new facility information presentation device and a new facility information presentation method, that can assist the effective use of the time needed to charge a storage cell onboard at a charging facility.

Means for Solving the Problems

Considered from a first standpoint, the present invention is a facility information presentation device comprising: an acquiring part configured to acquire a current position information indicating a current position of a moving body; a calculating part configured to calculate a charging time, which is a time for charging a driving energy in a storage cell of the moving body, at a charging facility for charging the driving energy in the storage cell of the moving body; a retaining part configured to previously retain a standard time indicating an average time to be spent using each of a plurality of peripheral facilities of the charging facility; and a selecting part configured to select one or more peripheral facilities to be presented among the peripheral facilities of the charging facility, on the basis of the current position information acquired by the acquiring part, the charging time calculated by the calculating part, and the standard time retained in the retaining part.

And, considered from a second standpoint, the present invention is a facility information presentation method for being utilized in a facility information presentation device comprising a retaining part to previously retain a standard time, which indicates an average time to be spent for utilizing respective peripheral facilities around a charging facility, comprising the steps of: acquiring a current position information indicating a current position of a moving body; calculating a charging time, which is a time for charging a driving energy in a storage cell of the moving body, at a charging facility for charging the driving energy in the storage cell of the moving body; and selecting one or more peripheral facilities to be presented among the peripheral facilities of the charging facility, on the basis of the current position information acquired by the acquiring step, the charging time calculated by the calculating step, and the standard time retained in the retaining part.

Moreover, considered from a third standpoint, the present invention is a facility information presentation program, wherein the program causes a calculation part to execute a facility information presentation method according to the present invention.

And, considered from a fourth standpoint, the present invention is a recording medium, wherein a facility information presentation program according to the present invention is readably recorded by the calculation part.

BRIEF DESCRIPTION OF THE DRAWINGS

FIG. 4 is a diagram describing the contents of the charging facility information of FIG. 3.

EMBODIMENTS FOR CARRYING OUT THE INVENTION

Figure 1:
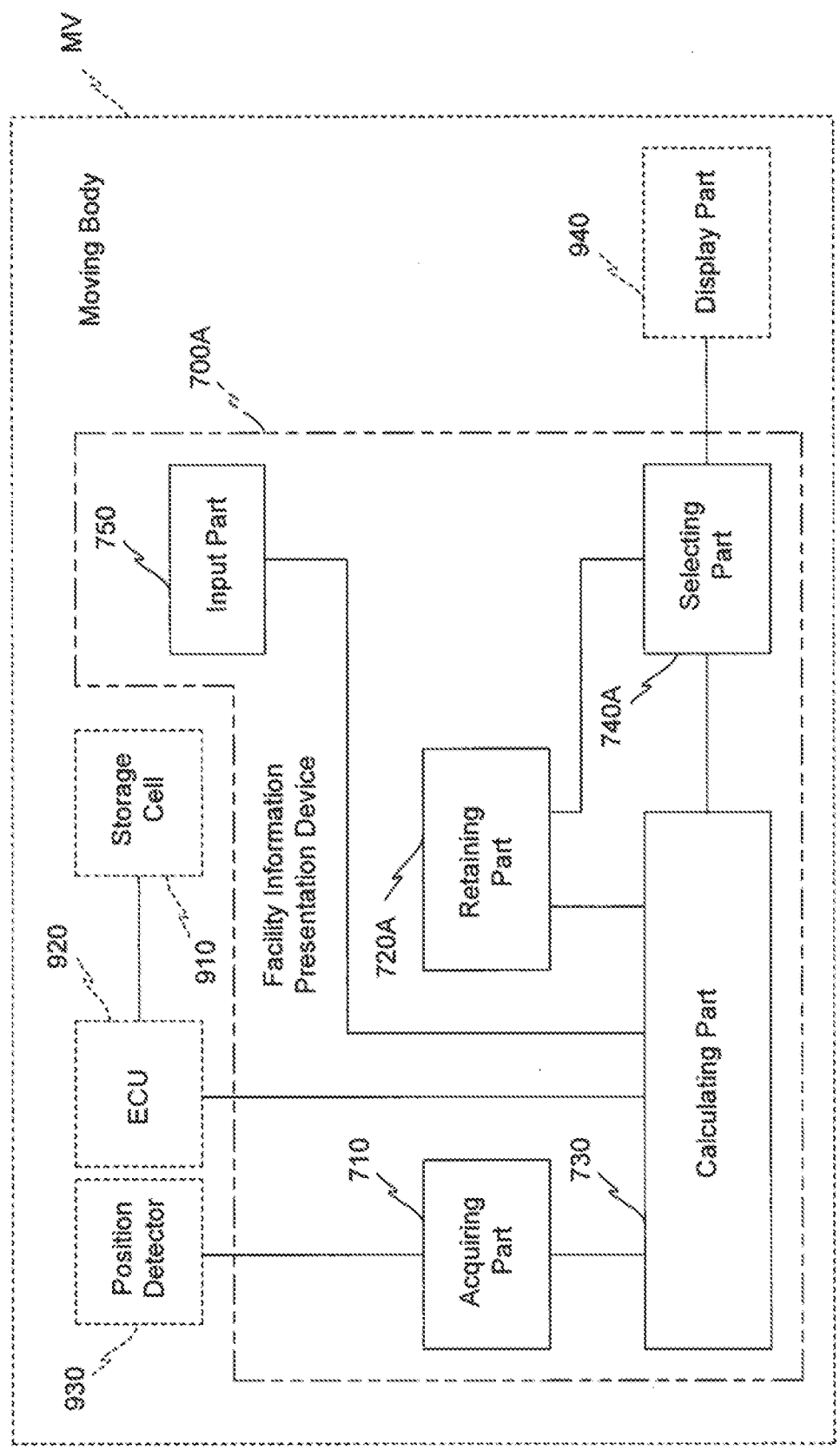
FIG. 1 is a block diagram schematically illustrating the configuration of a facility information presentation device according to the first embodiment of the present invention.

Hereinafter, the embodiments of the present invention will be described with reference to the accompanying drawings. It should be noted that the same reference numerals are given to identical or equivalent elements and overlapping descriptions are omitted in the following descriptions and drawings.

The First Embodiment

Firstly, the first embodiment of the present invention will be described with reference to FIG. 1.
<Configuration>
FIG. 1 schematically illustrates the configuration of a facility information presentation device 700A according to the first embodiment. As illustrated in FIG. 1, the facility information presentation device 700A is installed on a moving body MV.

In the first embodiment, the moving body MV is equipped with a storage cell 910 and an ECU (Electronic Control Unit) 920. In addition, in the first embodiment, the moving body MV is equipped with a position detection part 930 and a display part 940.

Here, the driving energy for the moving body MV is stored in the storage cell 910. The moving body MV travels using the driving energy. Driving energy can be charged in the storage cell 910, at a charging facility established in each place.

The ECU 920 acquires the detection results obtained from various sensors for detecting the state of the moving body MV. Based on the acquired detection results, ECU 920 controls and manages the travel of the moving body MV, outputting various parameter values useful for controlling the travel of the moving body MV.

In the first embodiment, the parameter values outputted by the ECU 920 include the full charge capacity of the storage cell 910 and the current value of the remaining energy amount. The ECU 920 transmits the full charge capacity of the storage cell 910 and the current value of the remaining energy amount to the facility information presentation device 700A.

The position detector 930 detects the current position of the moving body MV, and transmits the detected current position to the facility information presentation device 700A.

Note that in the present embodiment, the current position of the moving body MV is detected by using the GPS (Global Positioning System) positioning method.

The display part 940 receives display data transmitted from the facility information presentation device 700A. The display part 940 displays images according to the display data.

The facility information presentation device 700A operates under the environment in which the elements 910 to 940 are provided. The facility information presentation device 700A comprises an acquiring part 710, a retaining part 720A, a calculating part 730, a selecting part 740A, and an input part 750.

The acquiring part 710 acquires the current position transmitted from the position detector 930. Then, the acquiring part 710 transmits the acquired current position to the calculating part 730.

The retaining part 720A retains a map information, a charging facility information, and an energy consumption information indicating the energy consumption amount per travel distance as one unit (hereinafter, it is referred to as the "energy consumption information per unit distance"). Here, the charging facility information includes the identifiers for the respective charging facilities, the positions of the charging facilities, the charging capability (charging speed), the availability for visiting after the charging, and information on peripheral facilities, wherein the information is recorded so as to be associated with each of the charging facilities. Also, the peripheral facility information includes types of the peripheral facilities, the names of them, the standard time expended for utilizing the peripheral facilities, wherein the information is registered so as to be associated with each of the peripheral facilities.

Note that the "standard time" means the sum of the average time for visiting and for shuttling between the charging facility and the peripheral facilities, regarding each of the peripheral facilities. Here, the average shuttling time is both-way time when the user visits the peripheral facilities from the charging facility as the starting point by using ordinary transportation system (on foot, by fixed route bus, etc.).

The calculating part 730 receives the current position transmitted from the acquiring part 710. The calculating part 730 also receives the facility information presentation instruction transmitted from the input part 750. Note that in the first embodiment, the facility information presentation instructions include designations for the full charge or for the charging facility at which the next charging is schedules (hereinafter, it is referred to as the "next charging facility") as parameters. Here, as the examples for the facility information presentation instruction, which includes the designation of the next charging facility as the parameter, by the user; there is mentioned that the user performs the facility information presentation instruction designating the charging facility at the destination as the next charging facility, when the minimum required driving energy is charged to the moving body for arriving at the destination having the charging facility as early as possible. Note that the "next charging facility" used herein may include the user's own house, if the user has the charging facility for the storage cell 910 in the house.

When receiving the facility information presentation instructions, the calculating part 730 specifies the charging facility which is going to be used for the next charging, refereeing to the charging facility information in the retaining part 720, based on the current position transmitted from the acquiring part 710. Subsequently, the calculating part 730 calculates the time required for charging (charging time) at the specified charging facility. Then, the calculating part 730 transmits the calculated charging time and the identifier for the specified charging facility to the selecting part 740A.

Note that the charging time calculation processing by the calculating part 730 will be described later in detail.

The selecting part 740A receives the charging time and the identifier of the charging facility both of which have been transmitted from the calculating part 730. Then, based on the charging time and the identifier, the selecting part 740A selects peripheral facilities, referring to the peripheral facility information associated with the charging facility specified by using the identifier registered in the retaining part 720.

Subsequently, the selecting part 740A generates display data for presenting the selected peripheral facilities. Then, the selecting part 740A transmits the generated display data to a display part 940. Consequently, the peripheral facility information is displayed on the display part 940 and presented to a user.

The input part 750 is composed of keyboard, etc. Upon inputting the facility information presentation instruction to the input part 750, it transmits the instruction to the calculating part 730.

<Operation>

Hereinafter, the facility information presentation processing, which is performed by the facility information presentation device 700A, having the configuration as described above will be described.

This facility information presentation processing begin with the input of the facility information presentation instruction by the user using the moving body, who arrived at the charging facility to be used to perform the next charging. When the designation of the facility information presentation is inputted, the input part 750 transmits the facility information presentation instruction to the calculating part 730.

The calculating part 730, which has received the facility information presentation instruction, firstly acquires the current position information transmitted from the position detector 930 via the acquiring part 710. Subsequently, based on the acquired current position, the calculating part 730 searches for the positions of the charging facility in the charging facility information registered in retaining the part 720 to specify the charging facility for the next charging.

Next, depending on the facility information presentation the instruction, the calculating part 730 determines which charge mode is designated, either designation of the full charge or the charge to be required for travelling to the next charging facility. If full charge is designated, the calculating part 730 calculates the charging time up to full charge, based on the full charge capacity and remaining energy amount both of which have been transmitted from the ECU 920, with the charging capability of the specified charging facility in the retaining part 720.

By contrast, if the charge required for travelling to the next charging facility has been designated, the calculating part 730 firstly calculates the standard travel distance to the next charging facility, referring to map information in the retaining part 720. Subsequently, the calculating part 730 calculates the standard charged amount, based on the calculated travel distance, the energy consumption information per unit distance retained in the retaining part 720 and the remaining energy amount transmitted from the ECU 920.

Next, the calculating part 730 calculates the final charged amount to be charged, by multiplying the calculated standard charged amount by the margin coefficient (for example, "1.2"). Then, the calculating part 730 calculates the charging time, based on the calculated final charged amount and the charging capacity of the specified charging facility in the retaining part 720.

Note that the margin coefficient is predetermined based on experiments, simulations, experiences, and the like, from the viewpoint so as to arriving at the next charging facility.

When the charging time is calculated as previously described, the calculating part 730 transmits the calculated charging time to the selecting part 740A. The calculating part 730 also transmits the identifier of the specified charging facility to the selecting part 740A in addition to the calculated charging time.

The selecting part 740A received the charging time and the identifier of the charging facility, firstly refers to the availability for visiting after the charging being registered in association with the identifier in the retaining part 720A at the charging facility of the current position to determine the availability for visiting after the charging or not. If visiting after the charge completion is possible, the selecting part 740A selects the predetermined number of peripheral facilities, for example, 5 as the upper limit among the peripheral facilities that have been registered in association with the identifier, wherein the selected facilities have the standard time not less than the charging time, in the order of the closest. Consequently, the charging facility are selected in order of the shortest unnecessary occupation time for the charging device therein, wherein the charging is completed when the user return to the charging facility from the peripheral facilities to enable the immediate departure for the user.

By contrast, if the visit after the completion of the charging is impossible, the selecting part 740A selects the peripheral facilities, for example, 5 as the upper limit among the peripheral facilities that have been registered in association with the identifier, wherein the selected facilities have the standard time not larger than the charging time, in the order of the closest. Consequently, the peripheral facilities are selected among those in the range of limited visiting time in order of the shortest charge waits from returning to the charging facility after using the peripheral facilities.

When the selection of the peripheral facilities thus finished, the selecting part 740A generates display data for displaying the selection results on the display part 940, wherein the data includes the types and the names of the peripheral facilities. Then, the selecting part 740A transmits the generated display data to the display part 940.

The display part 940 that has received the display data transmitted from the selecting part 740A displays the peripheral facility information chosen by the selecting part 740A, according to the display data. Consequently, the peripheral facility information is presented to the user.

As described above, in the first embodiment, the user of the moving body MV arrives at the charging facility for the next charging to input the facility information presentation instruction to the input part 750. The calculating part 730 firstly acquires the current position acquired by the acquiring part 710. Subsequently, based on the acquired current position, the calculating part 730 searches the charging facility position in the charging facility information in the registered retaining part 720 to specify the charging facility for the next charging.

Next, the calculating part 730 calculates the charging time based on the charged amount and the charging capability of the specified charging facility in the retaining part 720. Then, the selecting part 740A selects the peripheral facilities to be presented to the user to display the selected peripheral facility information on the display part 940, based on the calculated charging time which shows the standard expended hours for utilizing the respective peripheral facilities, which are registered in association with the specified charging facility retained in the retaining part 720.

Therefore, according to the first embodiment, the present invention may assist for the effective use of the time required to charge the storage cell onboard the moving body at the charging facility.

In addition, in the first embodiment, if full charge is designated by a user, the calculating part 730 calculates the charging time to achieve both of the full charge based on the full charge capacity and remaining energy amount being transmitted from the ECU 920, along with the charging capability of the specified charging facility. Thereby, the charging time until full charge may be accurately calculated.

Also, in the first embodiment, the calculating part 730 firstly calculates the standard travel distance to the next charging facility with reference to map information in the retaining part 720, when the charge required for travelling to the next charging facility is designated. Then, the calculating part 730 calculates the standard charged amount based on the calculated travel distance, the energy consumption information per unit distance retained in the retaining part 720, and the remaining energy amount transmitted from the ECU 920. Next, the calculating part 730 calculates the charged amount to be finally charged, multiplying the calculated standard charged amount by the margin coefficient. Then, the calculating part 730 calculates the charging time based on both of the calculated final charged amounts and the charging capability of the specified charging facility in the retaining part 720. Therefore, the suitable charging time for ensuring travel to the next charging facility may be calculated.

Also, in the first embodiment, if visiting after the charge completion is possible, the selecting part 740A selects the predetermined number of the peripheral facilities among the peripheral facilities that have been registered in association with the identifier, wherein the selected facilities have the standard time not larger than the charging time, in the order of the closest. Consequently, the peripheral facilities are selected among those in the range of limited visiting time in order of the shortest charge waits from returning to the charging facility after using the peripheral facilities. Therefore, the charging is completed when the user returns from the peripheral facility to be used; it enables immediate departure from the charging facility. Thereby, it enables to choose the charging device in the order of short occupancy time, which is dead time for the charging facility.

In the first embodiment, if the visit after the completion of the charging is impossible, the selecting part 740A selects the predetermined number as the upper limit of the peripheral facilities among the peripheral facilities being registered in association with the charging facilities, wherein the selected facilities have the standard time not larger than the charging time, in the order of the closest. Thereby, it enables to choose the charging device in the order of short occupancy time, which is dead time for the charging facility.

The Second Embodiment

Hereinafter, the second embodiment of the present invention will be described with reference to FIG. 2.
<Configuration>

Figure 2:
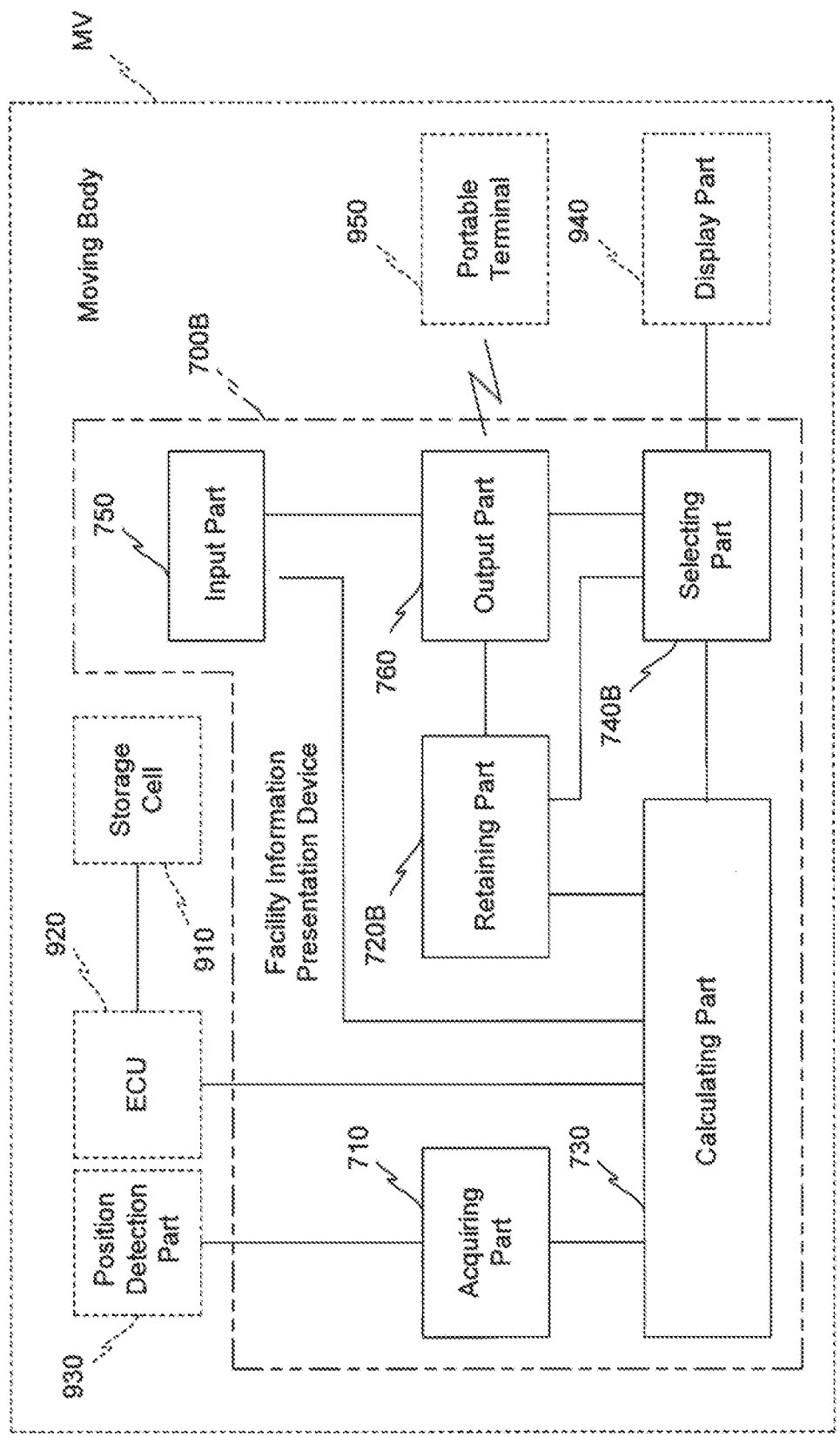
FIG. 2 is a block diagram schematically illustrating the configuration of a facility information presentation device according to the second embodiment of the present invention.

FIG. 2 schematically illustrates the configuration of a facility information presentation device 700B according to the second embodiment. As illustrated in FIG. 2, the facility information presentation device 700B is different from the facility information presentation device 700A of the first embodiment in that the device 700B comprises a retaining part 720B instead of the retaining part 720A, a selecting part 740B instead of selecting part 740A, and further an output part 760. The following description will be provided focusing on these differences.

Note that if the order of the usage facility is inputted by a user, the input part 750 transmits the use facility designation to the output part 760.

The retaining part 720B retains the charging facility information in the second embodiment. Here, the charging facility information in the second embodiment is the information in which the positions of the peripheral facilities are further associated with the plural peripheral facilities respectively, comparing to the charging facility information retained in the retaining part 720A.

The selecting part 740B performs the same processing as that of 740A described above and transmits the selection results of the peripheral facilities with the identifiers of the selected peripheral facilities to the output part 760. Except for this point, the selecting part 740B carries out the same processing as the processing of the selecting part 740A.

The output part 760 receives the selection results transmitted from the selecting part 740B. Then, upon receiving the usage facility designation transmitted from the input part 750, the output part 760 outputs the moving path from the charging facility of the current position to the designated usage facility. Thus outputted data of the moving path is transmitted to a portable terminal 950 having image display capabilities such as with smartphones, and so forth by using wireless communication.
<Operation>

Hereinafter, the facility information presentation processing performed by the facility information presentation device 700B having the above-mentioned configuration will be described.

In the facility information presentation device 700B, it performs the same processing as those by the device 700A from the input of the facility information presentation instruction into the input part 750 by the user of the moving body MV arrived at the charging facility for the next charging to the selection of the peripheral facilities by the selecting part 740B. After finishing the selection of the peripheral facilities, the selecting part 740B transmits the selection results of the peripheral facilities added with the identifiers of the selected peripheral facilities to the output part 760.

Also, when the selection of the peripheral facilities is terminated, the selecting part 740B generates the display data for displaying the selection results including the types and names of the peripheral facilities to display the part 940 in the same manner as in the selecting part 740A. Then, the selecting part 740B transmits the generated display data to display part 940. Consequently, similar to the first embodiment, the peripheral facility information is displayed on the display part 940 and presented to the user.

When the user inputs the instruction for specifying one of the displayed peripheral facilities as one of the usage facility by operating the input part 750, referring to the peripheral facilities displayed on the display part 940 to operate the input part 750, the input part 750 transmits the usage facility specification to the output part 760. Upon receiving the usage facility specification, the output part 760 outputs the moving path from the current position of the charging facility to the specified peripheral facility.

In the output of the moving path, the output part 760 firstly reads the position of the peripheral facility specified from the retaining part 720B and the position of the charging facility (that is, the charging facility at the current position) associated with the specified peripheral facility. Subsequently, the output part 760 outputs the moving path from the charging facility at the current position to the designated usage facility, referring to the map information in the retaining part 720B. Then, the output part 760 transmits the data of the outputted moving path to the mobile terminal 950 held by a user by wireless communication.

The mobile terminal 950 receives the data of the outputted moving path to store the data within itself. Then, when the display instruction of the outputted moving path is performed by the user, the outputted moving path is displayed on the mobile terminal 950.

As described above, in the second embodiment, similar to the first embodiment, the peripheral facilities to be presented to the user are selected, and the selected peripheral facility information is displayed on the display part 940. Therefore, according to the second embodiment, similar to the first embodiment, the present invention may assist the effective use of a storage cell onboard a moving body at a charging facility.

Also, in the second embodiment, the user designates the peripheral facility among the peripheral facility information by operating the input part 750, referring to the display results of the selected peripheral facility information; then, the output part 760 outputs the moving path from the charging facility being used for charging to the designated peripheral facility. Then, the output part 760 transmits the outputted results to the mobile terminal 950 held by the user. Therefore, it allows for the user to timely refer the outputted moving path in the mobile terminal 950, in shuttling between the charging facility and the designated peripheral facility. By this, it may improve convenience for the user.

Modification of the Embodiments

Note that both in the facility information presentation devices in the first and second embodiments, the position detection part outside the device acquired the detection results of the current position. By contrast, when the device has no position detection part outside for use, the configuration may be employed that the acquiring part in the facility information presentation device exerts the detection function of the current position instead of the position detection part.

Also, both in the facility information presentation devices of the first and second embodiments, ECU outside the device reports the full charge capacity and the remaining energy amounts. By contrast, if it is difficult to receive the report of at least one of the full charge capacity and the remaining energy amount, the facility information presentation device may employ the configuration including the sensor and the like for obtaining values having the difficulty in receiving the report.

In addition, both in the first and second embodiments, all of the configuration elements of the facility information presentation device are mounted on a moving body. By contrast, the configuration may be employed, in which any constitution elements except the acquiring part may be included in a server device disposed at a remote site, and a terminal device that communicate with the server device is mounted on the moving body.

Both in the first and second embodiments, the charge modes include two types of designations: the full charge designation and the charge designation to specify the charge amount required for travelling to the next charging facility. By contrast, the charge mode may include further designations to designate the charged amount, the charge rate, the travel distance necessary for reaching the destination, and the like.

In the first and second embodiments, the peripheral facilities to be presented was selected based on the average time for spending in each of the peripheral facilities, which is associated with the charging facility and at which the charging is performed, and the availability for visiting the facilities after completion of the charging. By contrast, if the visiting time is limited, the peripheral facilities to be presented may be selected, considering the time limit. If the availability of visiting changes depending on the time zone, they may be selected, considering the time zone. In addition, the peripheral facilities to be presented may be selected further considering seasons, weather, time zone, and the like.

In addition, further considering user preferences, use advisability, etc. of peripheral facilities, peripheral facilities to be presented may be selected. Here, user preference, use advisability of peripheral facilities, etc. may be registered in advance. In addition, user preferences may be anticipated according to the designation tendencies of the usage facility in the second embodiment.

In the first and second embodiments, the selected peripheral facility information was presented by using the image display. However, it may be presented by using the audio output along with the image display, or instead of the image display.

Also, in the second embodiment, the moving path data was transmitted to a mobile terminal by using the wireless communication. By contrast, if the mobile terminal has a connection part for the wired communication, the moving path data may be sent to the mobile terminal by using the wires communication via the removable cable.

In addition, both in the first and second embodiments, when a user of a moving body trying to charge arrived at the charging facility and inputs the facility information presentation instruction to the input part, the facility information presentation processing starts to specify the charging facility at which the charging is performed based on the current position detected by the position detection part. By contrast, on the way to the charging facility for the next charging (including while travelling, stopping, parking, resting and so forth), the peripheral facility information of the charging facility may be presented.

In this case, on the way to the charging facility, the facility information presentation instruction is inputted to the input part, designating the charging facility for charging and the charging manner including the full charge and the charge amount for travelling to the charging facility for the next charging and either one is designated. By this, the travel distance to the charging facility is firstly calculated based on the current position of the moving body and the position of the charging facility. Subsequently, the energy consumption amount until arriving at the charging the charging facility is estimated based on the calculated travel distance and the energy consumption information per unit distance. Then, based on the estimated energy consumption amount and the remaining energy amount at present, the remaining energy amount on the arrival time at the charging facility is estimated. After this, the same processing as the facility information presentation processing in the first or second embodiment is carried out, and information on peripheral facilities of the charging facility is presented.

Further, before the moving body starts travelling towards the charging facility for the next charging, for example, in a place distant from the moving body, such as inside of the user's own house, the peripheral facility information of the charging facility for the next charging may be presented. As one configuration example for providing such a function, there is the configuration that has communication functions: the facility information presentation device mounted on the moving body can communicate with the outside thereof, constantly operates; and enables the input of the facility information presentation instruction by using the input part equipped with the terminal device for communicating with the facility information presentation device, further enabling the facility information presentation by using the display part equipped with the terminal device.

In this case, the facility information presentation instruction designating the charging facility for charging and the charging manner including the full charge and the charge amount for travelling to the charging facility for the next charging to be chosen either, is inputted to the input part of the terminal device. Then, the designation is transmitted to the facility information presentation device provided in the moving body. In the facility information presentation device, firstly, the travel distance to the charging facility is calculated based on the current position of the moving body and the position of the charging facility. Subsequently, the energy consumption amount until arriving at the charging facility is estimated based on the calculated travel distance and the energy consumption information per unit distance; then, the remaining energy amount at the time of arriving at the charging facility is estimated based on the estimated energy consumption amount and the remaining energy amount at the present moment. Afterward, when the same processing as the processing of the facility information presentation in the first or second embodiment is executed, the peripheral facilities of the charging facility information is obtained, after which the peripheral facility information is transmitted to the terminal device and presented on the display part of the terminal device.

In addition, as another configuration example for enabling the presentation of the peripheral facilities of the charging facility information for the next charging in a place distant from the moving body, there is mentioned the configuration in which an information processing device for executing the same processing as the processing of the facility information presentation in the first or the second embodiment is separately prepared. In this case, the facility information presentation instruction designated the current position of the moving body MV, the charging facility for charging, and the charging manner, which is one of the full charge and the charge for travelling to the charging facility for the next charging, is inputted to the input part of the information device. If such input is executed, in the information processing device, firstly, based on the current position of the moving body and the position of the charging facility, the travel distance to the charging facility is calculated. Subsequently, based on the calculated travel distance and the energy consumption information per unit distance, the energy consumption amount until arriving at the charging facility is estimated. Then, based on the estimated energy consumption amount and the current remaining energy amount acquired by communication between ECU, the remaining energy at the time of arriving at the charging facility is estimated. Thereafter, the same processing as the processing of the facility information presentation in the first or second embodiment is executed and information on peripheral facilities of the charging facility is presented by the presentation part of the information processing device.

Note that if the information processing device can communicate with the position detector of the moving body, the input of the current position of the moving body to the input part of the information processing device can be omitted.

Note that in the first and second embodiments, the parts other than the input part of the facility information presentation device are configured as a computer as the operation part including central processing unit (CPU: Central Processing Unit), etc., and a prepared program is executed by the computer, whereby part or all of the processing of the facility information presentation device may be executed. This program is recorded in a recording medium such as a hard disk, CD-ROM. DVD, etc. that can be read by the computer, and loaded and executed from the computer. In addition, this program may be acquired in a form recorded in portable recording mediums such as CD-ROM, DVD, etc., or may be acquired in distribution form via a network such as the Internet.

EXAMPLES

Hereinafter, one example of the facility information presentation device of the present invention will be described with reference to FIGS. 3 to 8. It should be noted that in the following descriptions and drawings, the same reference numerals are given to identical or equivalent elements and overlapping descriptions are omitted.

(Configuration)

Figure 3:
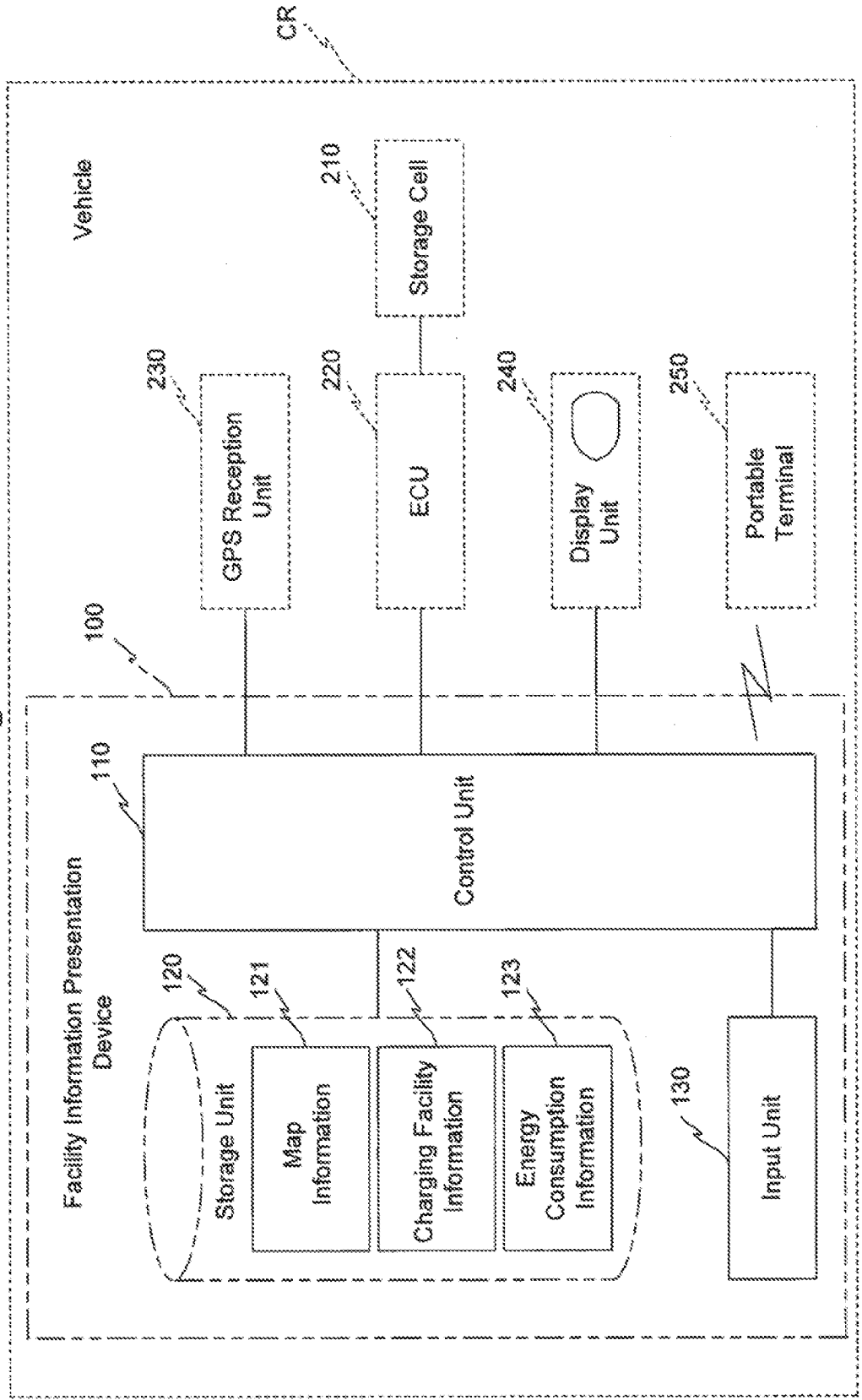
FIG. 3 is a block diagram schematically illustrating the configuration of a facility information presentation device according to an example of the present invention.

FIG. 3 schematically illustrates the configuration of a facility information presentation device 100 according to one example. Note that the facility information presentation device 100 shows one aspect of the facility information presentation device 700B (refer to FIG. 2) in the second embodiment.

The facility information presentation device 100 is mounted on a vehicle CR as the moving body MV that travels on roads by using an electric motor as a driving mechanism. The vehicle CR is equipped with a storage cell 210 and the ECU 220. Also, in the present example, a GPS reception unit 230 as the position detecting part 930 and a display unit 240 as the display part 940 are mounted on the vehicle CR.

Here, the driving energy of the vehicle CR is stored in the storage cell 210. The vehicle CR travels using such driving energy. The driving energy may be charged in the storage cell 210, at a charging facility established at each location.

The ECU 220 acquires the detection results obtained by various sensors for detecting the state of the vehicle CR. Based on the acquired detection results, the ECU 220 controls the power motor to manage the battery and the like, outputting various parameter values effective in controlling the travel of the vehicle CR.

Note that in the present example, the parameter values outputted by the ECU 220 include the full charge capacity of the storage cell 210 and the current value of the remaining energy amount. The ECU 220 transmits the full charge capacity of the storage cell 210 and the current value of the remaining energy amount to the facility information presentation device 100.

The GPS reception unit 230 calculates the pseudo-coordinate value of the current position of the vehicle CR based on radio reception results from plural GPS satellites, thereby detecting the current position of the vehicle CR. The current position thus detected is transmitted to the facility information presentation device 100.

The display unit 240 includes a display device such as a liquid crystal display panel and the like. The display part 240 receives display data transmitted from the facility information presentation device 100. The display part 240 displays images according to the display data.

Note that a user ride on the vehicle CR holds the portable terminal 250 having the image display capabilities, and carries the portable terminal 250 when boarding the vehicle CR.

The facility information presentation device 100 operates in the environment in which the elements 210 to 250 are provided. As illustrated in FIG. 3, the facility information presentation device 100 comprises a control unit 110 functions as the acquiring part 710, the calculating part 730, the selecting part 740B, and the output part 760; a storage unit 120 functions as the retaining part 720B; and an input unit 130 functions as the input part 750.

The control unit 110 comprises a central processing unit (CPU). The control unit 110 functions as the acquiring part 710, the calculating part 730, the selecting part 740B, and the output part 760 by executing predetermined programs. Note that processing by the control unit 110 will be described later.

The storage unit 120 comprises a nonvolatile storage device such as a hard disk device and so forth, in which various information data used in the facility information presentation device 100 is stored. Such information data includes a map information 121, a charging facility information 122, and an energy consumption information indicating the energy consumption amount per unit travel distance 123 (hereinafter, it is also referred to as the "energy consumption information per unit distance"). The control unit 110 is accessible to the storage unit 120. Note that the charging facility information 122 will be described later in detail.

The input unit 130 is configured by a key part provided in the body part of the facility information presentation device 100, or a remote input device including the key part, etc. Here, as the key part provided in the body part, a touch panel provided on a display device may be used. Note that instead of a configuration having a key part, an audio input configuration may be adopted.

The operation content of the facility information presentation device 100 is set using this input unit 130. For example, either charge mode designation, the full charge designation or the charge designation for travelling to the next charging facility, may be designated. Also, one of the peripheral facilities, which is selected described below and displayed on the display unit 240, may be designated as a usage facility.

Next, the charging facility information 122 will be described. In the charging facility information 122, the identifier $IDT_j$ of the charging facility, the position $POS_j$ of the charging facility, the charging capability $PWA_j$ indicating the charged amount per unit time, the availability of visiting the facility after charging, and the peripheral facility information #j are registered in association with respective charging facilities #j (j=1, 2, . . . ). Here, in the information regarding the peripheral facilities #j, the types $PK_{jk}$ of the peripheral facilities, the names $NM_{jk}$ of the peripheral facilities, the standard time $TS_{jk}$ indicating an average expended hours spent in the peripheral facilities, and the positions $PS_{jk}$ of the peripheral facilities are registered in association with the respective peripheral facilities #(j, k (k=1, 2 . . . . )).

Here, the control unit 110 periodically acquires to update the contents of the charging facility information 122 from the server device that retains the information regarding the charging facility via a communication network. Note that the standard time $TS_{jk}$ is predetermined by a preliminary survey of respective peripheral facilities.

Note that the "standard time $TS_{jk}$" is sum of the average expended hours in the respective peripheral facilities #(j, k), and the average time for shuttling between the charging facility #j and respective peripheral facilities #(j, k). Here, the average shuttling time is the time for back and forth between to the peripheral facilities #(j, k), with the charging facility #j as the starting point by using the ordinary transportation system (on foot, the route fixed bus, etc.).

(Operation)

Next, the operation of the facility information presentation device 100 having the configuration will be described focusing on the facility information presentation processing, mainly on the processing to be executed by the control unit 110.

Note that the ECU 220 serially transmits the full charge capacity and the current value of the remaining energy amount to the control unit 110 of the facility information presentation device 100. Also, the GPS reception unit 230 serially transmits the detection results of the current position to the control unit 110.

The facility information presentation processing by the facility information presentation device 100 starts, when it receives the facility information presentation instruction sent from the input unit 130, in which the instruction is input by the user rode in the vehicle CR after arriving at the charging facility for the next charging.

Figure 5:
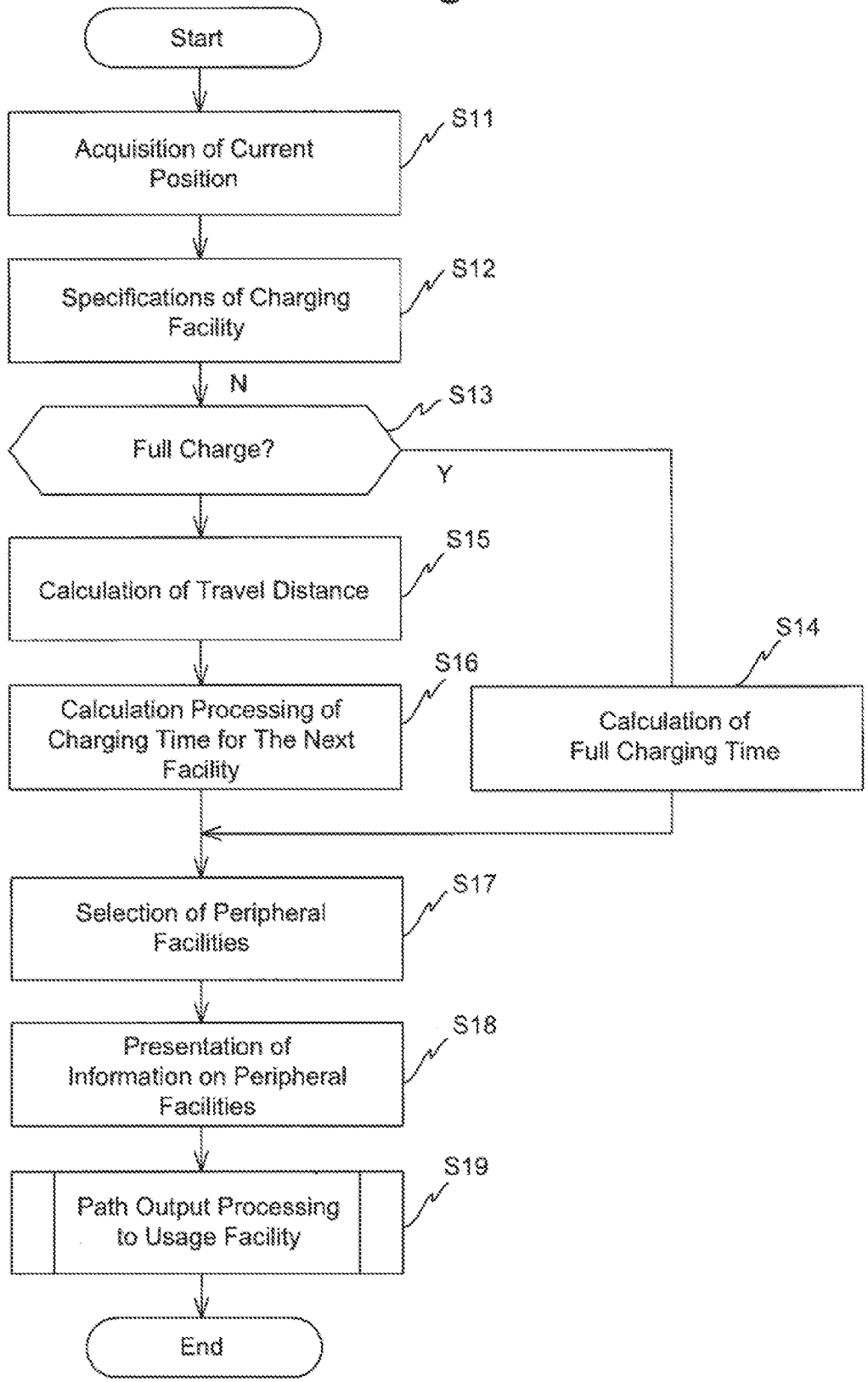
FIG. 5 is a flow chart describing the facility information presentation processing by the facility information presentation device of FIG. 3.

Firstly, as illustrated in FIG. 5, the control unit 110, which receives the facility information presentation instruction, acquires the current position transmitted from the GPS reception unit 230 in a step S11. Subsequently, based on the acquired current position, the control unit 110 searches for the charging facility position in the charging facility information 122, stored in the storage unit 120, to specify the charging facility for the next charging in a step S12.

Note that the following description will be provided on the assumption that the charging facility having the identifier "$IDT_1$" is specified.

Next, in a step S13, the control unit 110 decision whether or not the full charge is designated by the facility information presentation instruction. If the result of the decision is affirmative (Y in the step S13), the processing goes on to a step S14.

In the step S14, the control unit 110 calculates the time for the full charging (TF). In calculating the time for full charging (TF), the control unit 110 firstly acquires the full charge capacity (FV) transmitted from the ECU 220 and the present value (RV) of the remaining energy amount. Subsequently, the control unit 110 reads the charging capability value $PWA_1$ associated with identifier $IDT_1$ in the charging facility information 122 within the storage unit 120.

Next, the control unit 110 calculates the time for full charging (TF) as the charging time by using the following equation (1).

$$TF=(FV-RV)/PWA_1 \qquad (1)$$

Once the charging time is thus calculated, processing goes to the step S17 described in below.

If the result of the decision in the step S13 is negative (N in the step S13), the processing goes on to a step S15 for calculating the charging time for charging the energy enables to reach the next charging facility designated by the user (TN: hereinafter, it is referred to as "the charging time for the next charging facility"). Note that as the next charging facility, the following description will be given on the assumption that the charging facility having the identifier "$IDT_2$" is designated.

In the step S15, the control unit 110 reads the positions $POS_1$, $POS_2$ of the charging facilities, both of which are associated with the identifiers $IDT_1$ and $IDT_2$ in the charging facility information 122 stored in the storage unit 120. Subsequently, the control unit 110 calculates the standard travel distance to the next charging facility (RL), referring to the map information 121 stored in the storage unit 120.

Next, in a step S16, the control unit 110 calculates the charging time TN for the next charging facility. When the charging time TN for the next charging facility is calculated, the control unit 110 firstly acquires the full charge capacity (FV) transmitted from the ECU 220, and the present value (RV) of the remaining energy amount. Subsequently, the control unit 110 reads the charging capability ($PWA_1$) being associated with the identifier $IDT_1$ in the charging facility information 122 stored in the storage unit 120, and the energy consumption information 123 (CR) per unit distance.

Next, the control unit 110 calculates the energy amount NEV to reach the next charging facility by using the following equation (2).

$$NEV=C \cdot RL \cdot CR \qquad (2)$$

Here, the constant C (>1) is a margin coefficient and is predetermined based on experiments, simulations, experiences, and so forth from the viewpoint of ensuring travel to the next charging facility.

Subsequently, the control unit 110 determines whether the value NEV is larger than the value FV (the full charge capacity value). Then, if the value NEV is larger than the value FV, the indication that "the designation of the next charging facility is not suitable" is displayed on the display unit 240 to urge the user to designate a new next charging facility. Thereafter, if a new next charging facility is designated, the control unit 110 executes the processing from step S15 again.

If the value NEV is the value FV or less, the control unit 110 calculates the value (CV) of the charged amount by using the following equation (3).

$$CV=NEV-RV \qquad (3)$$

Next, the control unit 110 determines whether the value CV is a positive value or not. Then, if the value CV is not the positive value, the indication that "charging is not necessary" is displayed on the display unit 240 to inform the user that they can start immediately.

If the value CV is a positive value, the control unit 110 calculates the charging time (TN) for the next charging facility using the following equation (4).

$$TN=CV/PWA_1 \qquad (4)$$

Then, the processing goes on to the step S17.

In the step S17, the control unit 110 selects the peripheral facilities to be presented. In the selection of the peripheral facilities, the control unit 110 first refers to the charging facility information 122 stored in the storage unit 120 to determine whether the visiting the charging facility #1 (that is, the specified charging facility in the step S12) corresponding to the identifier $IDT_1$ is available or not. Then, if the visiting after charging is available, the control unit 110 selects the peripheral facilities to which standard time not less than the calculated charging time is set; in order of the standard time closest to the charging time, among plural peripheral facilities being registered in association with the identifier $IDT_1$, with a predetermined number (for example, five) as the upper limit. Consequently, the charging facilities wherein the charging is completed when returning to the charging facilities after using the peripheral facilities to enable the immediate departure therefrom are selected in order of the shortest unnecessary occupation time of the charging device at the charging facility.

Note that if the charging facility specified in the step S12, such as charging facility #2, is not available to visit after charging (refer to FIG. 4), the control unit 110 selects the predetermined number as the upper limit of the peripheral facilities having the set standard time not over the charging time, in order of the standard time closest to the charging time, among the peripheral facilities being registered in association with the identifier. Consequently, the peripheral facilities are selected in order of the shortest charge waits from the time of returning to the charging facility after visiting the peripheral facilities, as long as it is not beyond the time limit of visiting for the charging facility.

Subsequently, in a step S18, the control unit 110 generates the display data for displaying the selection results including the types and names of peripheral facilities on the display unit 240. Then, the control unit 110 transmits the generated display data to the display unit 240.

Upon receiving the display data transmitted from the control unit 110, the display unit 240 displays the peripheral facility information chosen by the control unit 110 according to the display data. Consequently, the peripheral facility information is presented to the user.

Figure 6A:
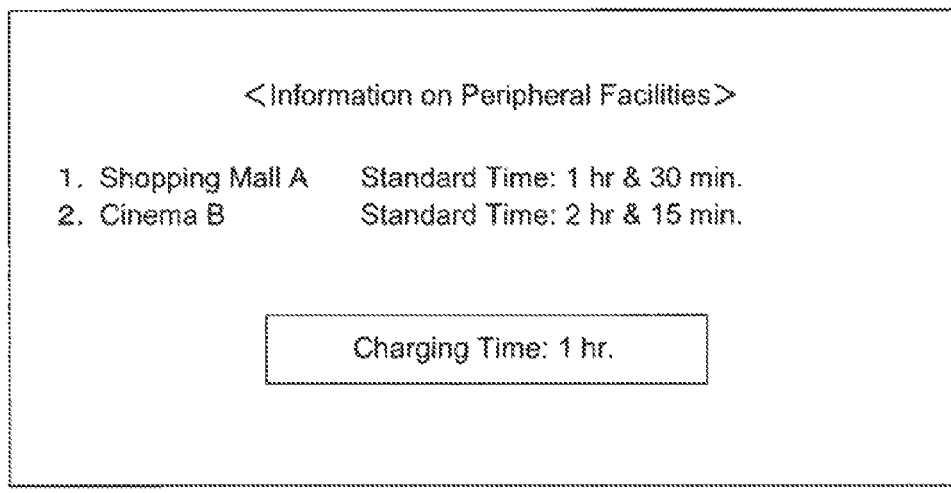
FIG. 6A is a diagram describing a presentation example (1) of the information on peripheral facilities in a step S18 of FIG. 5.
Figure 6B:
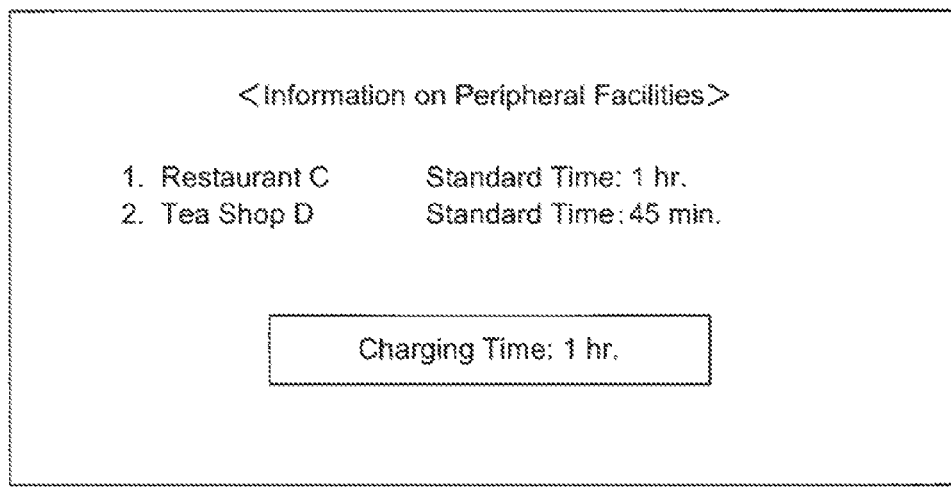
FIG. 6B is a diagram describing a presentation example (2) of the information on peripheral facilities in the step S18 of FIG. 5.

Note that FIG. 6A illustrates an example of the peripheral facility information that is displayed on the display unit 240 in the step S18, when the charging facility specified in the step S12 is available for visiting after the charging and the calculated charging time is 1 hr such as those in the charging facility corresponding to the identifier $IDT_1$ (refer to FIG. 4). Also, FIG. 6B illustrates the example of the peripheral facility information that is displayed on the display unit 240 in the step S18, when the charging facility specified in the step S12 is not available for visiting after the charging and the calculated charging time is 1 hr such as the facility corresponding to the identifier $IDT_2$ (refer to FIG. 4).

Figure 7:
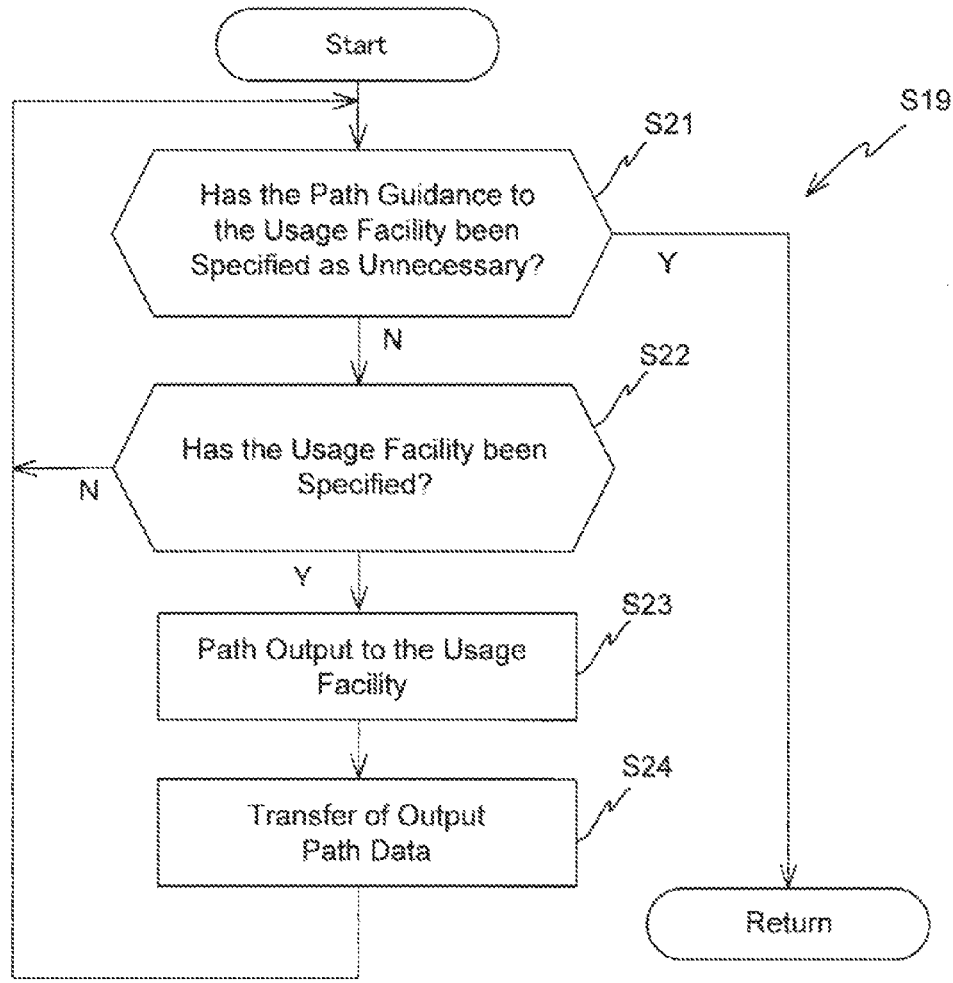
FIG. 7 is a flow chart describing the path output processing to a usage facility in a step S19 of FIG. 5.

Next, in a step S19, the control unit 110 executes output processing of the path to the usage facility. In the output processing of the path to the usage facility, as illustrated in FIG. 7, firstly, in a step S21, the control unit 110 decides whether or not the designation that the moving path guidance to the usage facility is not required is inputted to the input unit 130. If the result of the decision is affirmative (Y in the step S21), the control unit 110 ends the output processing of the moving path to the usage facility in the step S19, and thereafter terminates the facility information presentation processing.

If the result of the decision in the step S21 is negative (N in the step S21), the processing goes on to a step S22. In the step S22, it is decided whether or not one of the peripheral facilities of which information is displayed is designated as a usage facility by the user, who referred to the peripheral facility information displayed on display unit 240 in the step S18.

If the result of the decision in the step S22 is negative (N in the step S22), the processing returns the step S21. Then, the processing in the steps S21 and S22 is repeated.

If the usage facility designation is inputted by the user and the decision result in the step S22 becomes affirmative (Y in the step S22), the processing goes to a step S23. In the step S23, the control unit 110 outputs the moving path from the charging facility of the current position to the designated usage facility. In outputting the moving path, the control unit 110 firstly reads the position of the charging facility at the current position (namely, the specified charging facility in the step S12) and the position of the designated usage facility, from the charging facility information 122 stored in the storage unit 120. Subsequently, the control unit 110 outputs the moving path from the charging facility at the current position to the designated usage facility, referring to the map information 121 stored in the storage unit 120.

Next, in a step S24, the control unit 110 transmits the outputted moving path data to the movable terminal 250 held by the user by using wireless communication. Then, considering that the user needs the path guidance to other peripheral facilities, the processing goes back to the step S21. In the mobile terminal 250 received the data of the moving path, the outputted moving path may be displayed when the display of the outputted moving path is instructed by the user.

Afterward, the processing of the steps S21 to S24 is repeated to perform the output processing of the path to the usage facility until the path guidance becomes unnecessary. Then, the control unit 110 ends the output processing of the moving path to the usage facility in the step S19, and thereafter terminates the processing of facility information presentation, when the designation that the moving path guidance to the usage facility is not required is inputted to the input unit 130 as mentioned above.

Figure 8:
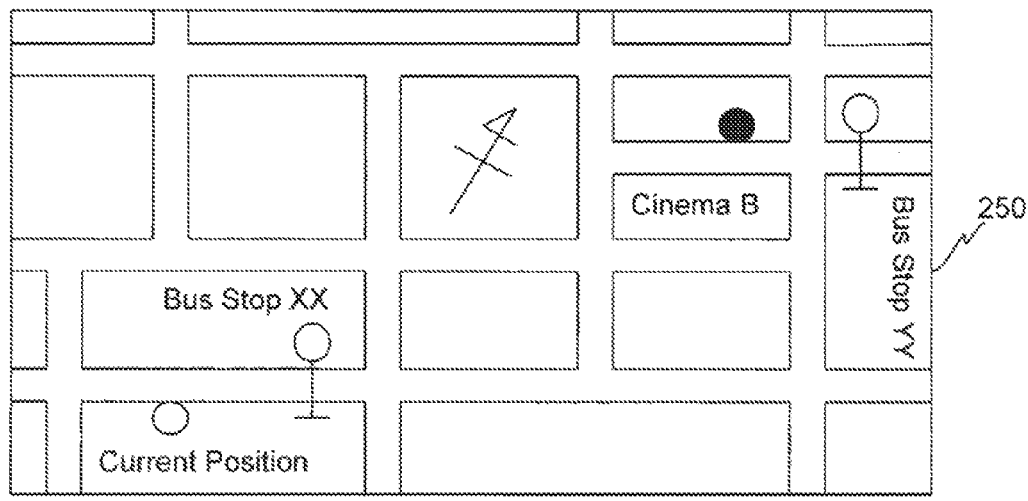
FIG. 8 is a diagram illustrating a display example of an outputted path.

Note that FIG. 8 illustrates a display example of the moving path to the usage facility in the mobile terminal 250.

As described above, in the present example, the control unit 110 firstly acquires the current position transmitted from the GPS reception unit 230, when the user of the vehicle CR, which arrived at the charging facility for the next charging, inputs the facility information presentation instruction into the input unit 130. Subsequently, based on the acquired current position, the control unit 110 searches for the position of the charging facility in the charging facility information 122 stored in the storage unit 120 to specify the charging facility for the next charging.

Next, the control unit 110 calculates the charging time, taking into consideration the charging capability of the specified charging facility in the charging facility information 122. Subsequently, the control unit 110 selects the peripheral facilities to be presented to the user based on both of the calculated charging time and the standard time indicating the average expended hours in the respective peripheral facilities, which relate to the specified charging facility in the charging facility information 122. Then, the control unit 110 displays the selected peripheral facility information on the display unit 240.

Accordingly, the present example may assist the effective use of the time needed to charge the storage cell onboard the moving body at the charging facility.

Also, in the present example, if the full charge is designated by the user, the control unit 110 calculates the charging time to achieve the full charge, based on the full charge capacity and remaining energy amount which have been transmitted from the ECU 220, and the charging capability of the specified charging facility. By this, the charging time to reach the full charge may be accurately calculated.

Alternatively, in the present example, if the charge required for travelling to the next charging facility is designated, the control unit 110 firstly calculates the average travel distance to the next charging facility, referring to the map information 121 stored in the storage unit 120. Then, the control unit 110 calculates the necessary charged amount, based on the calculated travel distance, the energy consumption information 123 per unit distance stored in the storage unit 120, and the remaining energy amount transmitted from the ECU 220. Next, the control unit 110 calculates the charging time, based on the calculated charged amount and the charging capability of the specified charging facility stored in the storage unit 120. By this, the charging time for ensuring travel to the next charging facility may be suitably calculated.

In the present example, if the visiting in the charging facility to be used for charging after completion of the charging is available, the control unit 110 selects the predetermined number, upper limit number, of the peripheral facilities to which the standard time not less than the charging time is set among the peripheral facilities, which are registered in association with the charging facility, in order of the standard time closest to the charging time. Therefore, the charging is completed when the user returns from the peripheral facility to be used; it enables immediate departure from the charging facility. Thereby, it enables to choose the charging device in the order of short occupancy time, which is dead time for the charging facility.

Also, in the present example, if the visiting of the charging facility to be used for the charging after the completion of the charging is not available, the control unit 110 selects the predetermined number, the upper limit, of peripheral facilities having the standard charging time or less, in order of the standard time closest to the charging time, among the peripheral facilities being registered in association with the charging facility, with the predetermined constant being the upper limit. Therefore, the charging is completed when the user returns from the peripheral facility to be used, it enables to immediately depart from the charging facility. Thereby, it enables to choose the charging device in the order of short occupancy time, which is dead time for the charging facility.

In the present example, the control unit 110 outputs the moving path from the charging facility for the ongoing charging to the peripheral facilities, when the user referred to the display results of the selected peripheral facility information to designate one facility among them. Then, the control unit 110 transmits the outputted results to the mobile terminal 250 held by the user. Therefore, it allows for the user to timely refer the outputted moving path in the mobile terminal 950, in shuttling between the charging facility and the designated peripheral facility. By this, it may improve convenience for the user.

Modification of the Example

The present invention is not limited to the example, and various modifications are possible.

For example, in the facility information presentation device of the example, the detection results of the current position are acquired by using the GPS reception unit as the position detection part outside the device. By contrast, if the device does not have any position detection part outside to be utilized, the device having the configuration that the facility information presentation device including the position detection part may be employed.

Also, in the facility information presentation device of the example, ECU outside the device reports the full charge capacity and the remaining energy amount. By contrast, if it has any difficulty to receive at least one of the reports for the full charge capacity and the remaining energy amount; the device having the configuration that the facility information presentation device includes the sensor and the like for receiving the above-mentioned report to receive with difficulty may be employed.

In addition, in the example, all of the configuration elements of the facility information presentation device are installed in the vehicle. By contrast, the configuration composed of a device performing a partial function of the facility information presentation device and a server device arranged in a distant area may be used to communicate with the server device via a network may be employed.

In the example, the charge mode may include two types of the designations: the full charge designation and the charge designation required for travelling to the next charging facility. By contrast, the charge mode may include the charged amount designation, the charge rate designation, the travel distance designation for safely arriving the destination, and the like.

Also, in the example, the peripheral facility information to be presented was selected, based on the standard times of respective peripheral facilities being associated with the charging facility, and the availability for visiting at the charging facility after the completion of the charging. By contrast, if the available time for the visiting is limited, the peripheral facilities to be presented may be selected, considering the limit. If the available time for visiting is changeable depending on the time zone, they may be selected based, considering the limited time zone. Also, the peripheral facilities to be presented may be selected further considering seasons, weather, and time zone period.

Further considering the user's preferences, recommendation for utilizing for the peripheral facilities, the information for the peripheral facility to be presented may be selected. Here, the user's preferences, recommendation for utilizing for the peripheral facilities and the like may be registered in advance. Further to the user's preferences, it may be assumed depending on the trends of the designation for the facility to be used.

Also, in the example, the selected peripheral facility information was presented by using the image display. By contrast, the selected peripheral facility information may be presented on audio output along with the image display, or solely itself instead of the image display.

In the example, the moving path data was transmitted to the mobile terminal by using the wireless communication. By contrast, if the mobile terminal has a connecting part for the wired communication, the moving path data may be transmitted to the mobile terminal by using the removable cable from the connecting part via the wired communication.

Also, in the example, the moving path to the usage facility is presented only by the mobile terminal; however, it may be presented by the display unit, rather than the portable terminal, in addition to the portable terminal.

In the example, the facility information presentation device was configured as a single device; however, for example, the function of the device of the present invention may be implemented to the car navigation system.

Also, the example may be modified by using "the modification that enables the presentation of the peripheral facility information of the charging facility on the way to the charging facility at which charging will be planned" or "the modification that enables the presentation of the peripheral facility information of the charging facility, at which the charging is scheduled but far from the vehicle staying place; prior to start to travel there" as described in the modified embodiment.

The program executed by the control unit 110 may be obtained in the form recorded on the portable recording media such as CD-ROM and DVD, or in the form distributed via a network such as internet.

In addition, in the example, the control unit 110 provides the functions of the acquiring part, the calculating part, the selecting part, and the output part by executing the program execution. However, partial or entire of these functions may be achieved by dedicated hardware resources.

The invention claimed is:

1. A facility information presentation device comprising:
an acquiring unit that acquires current position information indicating a current position of a vehicle; and
a selecting part configured to select one or more peripheral facilities to be presented from among peripheral facilities of a charging facility for the vehicle on the basis of the current position information, an average time spent using each of the peripheral facilities of the charging facility, a charging time that is an expected time for charging a storage cell of the vehicle at the charging facility for charging energy for driving the vehicle, and availability for the vehicle to occupy the charging facility after charging.

2. The facility information presentation device according to claim 1, wherein the one or more peripheral facilities are presented in order of closeness of the respective average time to the charging time.

3. The facility information presentation device according to claim 1, further comprising:
an output part configured to output a path for a user of the vehicle from the charging facility to a peripheral facility specified by the user from among the selected peripheral facilities.

4. The facility information presentation device according to claim 3, wherein the selecting part is further configured to consider, when selecting the one or more peripheral facilities, a user's preferences.

5. The facility information presentation device according to claim 1, wherein the selecting part is configured to select the peripheral facilities whose average time is not less than the charging time.

6. The facility information presentation device according to claim 1, wherein the selecting part is configured to select the peripheral facilities whose average time is not more than the charging time.

7. A facility information presentation method for a facility information presentation device of a vehicle, the facility information presentation device retaining an average time to be spent utilizing respective peripheral facilities around a charging facility for the vehicle, the method comprising the steps of:
acquiring current position information indicating a current position of the vehicle; and selecting one or more of the peripheral facilities to be presented from among the peripheral facilities of the charging facility on the basis of the current position information, average time to be spent utilizing the respective peripheral facilities around the charging facility, a charging time that is an expected time to be spent charging a storage cell of the vehicle at the charging facility for charging energy for driving the vehicle, and availability for the vehicle to occupy the charging facility after charging.

8. A non-transitory computer-readable medium having recorded therein a facility information presentation program that, when executed, causes the facility information presentation device to execute the facility information presentation method according to claim 7.

9. A facility information presentation device for a vehicle, comprising:
   a selecting part configured to select one or more peripheral facilities from among peripheral facilities of a charging facility for the vehicle, based on an average time spent using each of the peripheral facilities of the charging facility, and a charging time that is a time for charging a storage cell of the vehicle at the charging facility,
   wherein the selecting part selects the one or more peripheral facilities from among the peripheral facilities for which the average time is not less than the charging time.

10. The facility information presentation device according to claim 9, wherein the selecting part selects one of the peripheral facilities for which the average time is closest to the charging time and not less than the charging time.

11. The facility information presentation device according to claim 9, wherein the one or more peripheral facilities are presented in order of closeness of the respective average time to the charging time.

* * * * *